US009137128B2

(12) United States Patent
Ciavattone

(10) Patent No.: US 9,137,128 B2
(45) Date of Patent: Sep. 15, 2015

(54) DETECTING AND MEASURING NETWORK ROUTE RECONVERGENCE USING IN-BAND DATA PROBES

(75) Inventor: Leonard Ciavattone, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 763 days.

(21) Appl. No.: 12/962,730

(22) Filed: Dec. 8, 2010

(65) Prior Publication Data

US 2012/0151032 A1    Jun. 14, 2012

(51) Int. Cl.
*G06F 15/173* (2006.01)
*H04L 12/26* (2006.01)

(52) U.S. Cl.
CPC ............ *H04L 43/0811* (2013.01); *H04L 43/10* (2013.01)

(58) Field of Classification Search
CPC .......................... H04L 43/0811; H04L 43/10
See application file for complete search history.

(56) References Cited

U.S. PATENT DOCUMENTS

| | | | | |
|---|---|---|---|---|
| 6,697,325 B1 * | 2/2004 | Cain | ............................ | 370/217 |
| 7,570,581 B2 * | 8/2009 | Yoshizawa | ..................... | 370/218 |
| 7,746,796 B2 * | 6/2010 | Swallow et al. | ............... | 370/249 |
| 8,284,778 B2 * | 10/2012 | Ramachandran et al. | ..... | 370/394 |
| 8,804,719 B2 * | 8/2014 | Aldrin et al. | .................... | 370/390 |
| 2004/0252694 A1 * | 12/2004 | Adhikari et al. | ........... | 370/395.2 |
| 2006/0062199 A1 * | 3/2006 | Yoshizawa | ..................... | 370/351 |
| 2007/0008953 A1 * | 1/2007 | Wing et al. | .................... | 370/352 |
| 2008/0080507 A1 * | 4/2008 | Swallow et al. | .............. | 370/392 |
| 2008/0084880 A1 * | 4/2008 | Dharwadkar | ................. | 370/392 |
| 2008/0298265 A1 * | 12/2008 | Filsfils et al. | .................. | 370/252 |
| 2010/0124180 A1 * | 5/2010 | Benkis | ........................... | 370/252 |

* cited by examiner

*Primary Examiner* — Ranodhi Serrao
*Assistant Examiner* — Thomas Richardson
(74) *Attorney, Agent, or Firm* — Hartman & Citrin LLC

(57) ABSTRACT

The present disclosure is directed to systems and methods for detecting and measuring network route reconvergence using in-band data probes. The probes are generated and inserted into the network. The probes are routed to an insertion point, corresponding to a beginning of a measurement line, via an in-band connection such as a virtual private network. The in-band connection is configured such that the time-to-live field of the probes is not affected by network path changes occurring in the in-band connection. The probes are routed through the measurement line to measure network route reconvergence. The measurement line is configured to affect the time-to-live field of the probes to reflect network path changes occurring along the measurement line. The probes are extracted from an extraction point corresponding to an end of the measurement line and routed back to the measurement device for analysis.

18 Claims, 5 Drawing Sheets

DETECTING AND MEASURING NETWORK ROUTE RECONVERGENCE USING IN-BAND DATA PROBES

BACKGROUND

This application relates generally to measuring network performance. More particularly, the disclosure provided herein relates to detecting and measuring network route reconvergence using in-band data probes.

Network route reconvergence, a phrase used broadly to refer to various measures and/or aspects of amounts of network traffic that is re-routed from a primary or preferred path to a secondary path, can be measured in a number of ways. In some instances, network route reconvergence is measured using inferred network reconvergence due to network impairments such as loss, reordering, and the like. In other instances, data probes are inserted into various parts of a network to measure actual observed network reconvergence at those parts of the network.

Actual observed network reconvergence can be measured, for example, by examining the values stored in the time-to-live field ("TTL") of the data probes. Unlike inferred network reconvergence, the TTL field accurately and unambiguously represents network reconvergence as the TTL field value is decremented at each network "hop" or node. Analysis of the TTL field of the data probes therefore can provide an accurate and valuable picture of network route changes.

The TTL field reacts to any route changes experienced in the network. To obviate this, long-haul connections and/or distributed data probe generation devices can be used such that testing of various aspects of a network can be accurately tested. Thus, long out-of-band connections often exist between measurement devices and network insertion and/or extraction points such that the TTL field of the data probes reflect values based only upon network route changes experienced in particular portions of the network.

SUMMARY

The present disclosure is directed to systems and methods for detecting and measuring network route reconvergence using in-band data probes ("probes"). The probes are generated at a measurement device and inserted into the network by the measurement device. Instead of relying upon out-of-band connections such as long-haul connections to a desired insertion point, the measurement device is configured to insert the probes into the network at the measurement device. The network is configured to provide a number of virtual private networks ("VPNs"), which can be configured in accordance with VPN routing and forwarding technology ("VRF"). These VPNs configured in accordance with VRF technologies (referred to herein as "VRFs") are configured to allow enabling and disabling of the TTL field value changes within the respective VRFs.

Thus, the probes can be routed from the measurement device to an insertion point corresponding to a beginning of a measurement line via an in-band connection provided by a first VRF that is configured to disable changes to values in TTL fields of the probes. The probes are routed along the measurement line. A second VRF can be configured for routing the probes along the measurement line. The second VRF, corresponding to the measurement line, is configured to enable changes to values in TTL fields of the probes. The probes are extracted from the measurement line at an extraction point corresponding to the end of the measurement line. The probes can arrive at or be routed back to the measurement device. In some embodiments, the probes are routed back to the measurement device via a third VRF that is configured to disable further changes to values in TTL fields of the probes. Thus, when the probes arrive at the measurement device, the TTL fields reflect values changed only within the measurement line, despite being routed across the network via in-band connections. According to various embodiments, the concepts and technologies disclosed herein allow for testing of globally distributed networks and measurement lines without expensive long-haul connections and/or duplicated or distributed probe generation and/or measurement devices.

According to one aspect, a method for measuring network route reconvergence includes inserting a probe at an in-band connection. The probe includes a time-to-live field, and the in-band connection is configured not to change the time-to-live field for network path changes occurring at the in-band connection. The method also includes routing the probe to an insertion point including a beginning of a measurement line and routing the probe from the insertion point to an extraction point including an end of the measurement line. The measurement line is configured to change the time-to-live field for network path changes occurring at the measurement line. The method also includes analyzing the probe at the measurement device to measure the network route reconvergence. The measured network route reconvergence is based, at least partially, upon a value in the time-to-live field, which includes a value reflecting network path changes occurring at the measurement line.

According to some embodiments, the probes are generated at the measurement device and inserted into the in-band connection at the measurement device. The in-band connection includes devices configured as a virtual private network. The measurement line also includes, in some implementations, a further in-band connection. The in-band connection and/or the further in-band connection include, in some embodiments, devices configured in accordance with a multiprotocol label switching virtual private network routing and forwarding technology. The method also includes, in some implementations, routing the probe from the extraction point to the measurement device via an in-band connection. The in-band connection via which the probe is routed to the measurement device also includes, in some embodiments, devices configured as a virtual private network.

According to another aspect, a method for measuring network route reconvergence includes inserting a probe at an in-band connection. The probe includes a time-to-live field, and the in-band connection is configured not to change the time-to-live field for network path changes occurring at the in-band connection. The method also includes routing the probe to an insertion point including a beginning of a measurement line. The probe is routed to the insertion point via the in-band connection. The probe is routed from the insertion point to an extraction point including an end of the measurement line. The measurement line includes a further in-band connection configured to change the time-to-live field for network path changes occurring at the further in-band connection. The method also includes analyzing the probe at the measurement device to determine the network route reconvergence associated with the measurement line. The network route reconvergence determined at the measurement device can be determined based, at least partially, upon a value in the time-to-live field of the probe. The time-to-live field of the probe includes a value reflecting network path changes occurring at the measurement line.

According to some embodiments, the method includes generating the probe at the measurement device. The measurement device is configured to insert the probe into the in-band connection. The in-band connection includes, in some embodiments, a device configured as a virtual private network. The further in-band connection includes, in some embodiments, a further device configured as a further virtual private network. According to some embodiments, the in-band connection includes a device configured in accordance with a multiprotocol label switching virtual private network routing and forwarding technology. The further in-band connection also includes, in various implementations, a further device configured in accordance with the multiprotocol label switching virtual private network routing and forwarding technology.

According to another aspect, a computer storage medium includes computer executable instructions that, when executed by a measurement device, cause the measurement device to generate a probe including a time-to-live field. The probe is routed through a network to measure network route reconvergence. The network includes an in-band connection configured not to change the time-to-live field for network path changes occurring at the in-band connection. The network also includes a measurement line including a further in-band connection configured to change the time-to-live field for network path changes occurring at the measurement line. The probe is received at the measurement device and the measurement device analyzes the probe to determine the network route reconvergence based, at least partially, upon a value in the time-to-live field. The time-to-live field of the probe includes a value reflecting network path changes occurring at the measurement line.

According to some embodiments, the probe is inserted into the in-band connection at the measurement device. The in-band connection includes, in some embodiments, a device configured as a virtual private network. The measurement line also includes, in some implementations, a device configured as a virtual private network. In some embodiments, the in-band connection includes a device configured in accordance with a multiprotocol label switching virtual private network routing and forwarding technology. The further in-band connection includes a further device configured in accordance with the multiprotocol label switching virtual private network routing and forwarding technology.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure, and be protected by the accompanying claims.

DETAILED DESCRIPTION

The following detailed description is directed to methods, systems, and computer-readable media for detecting and measuring network route reconvergence using in-band data probes. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
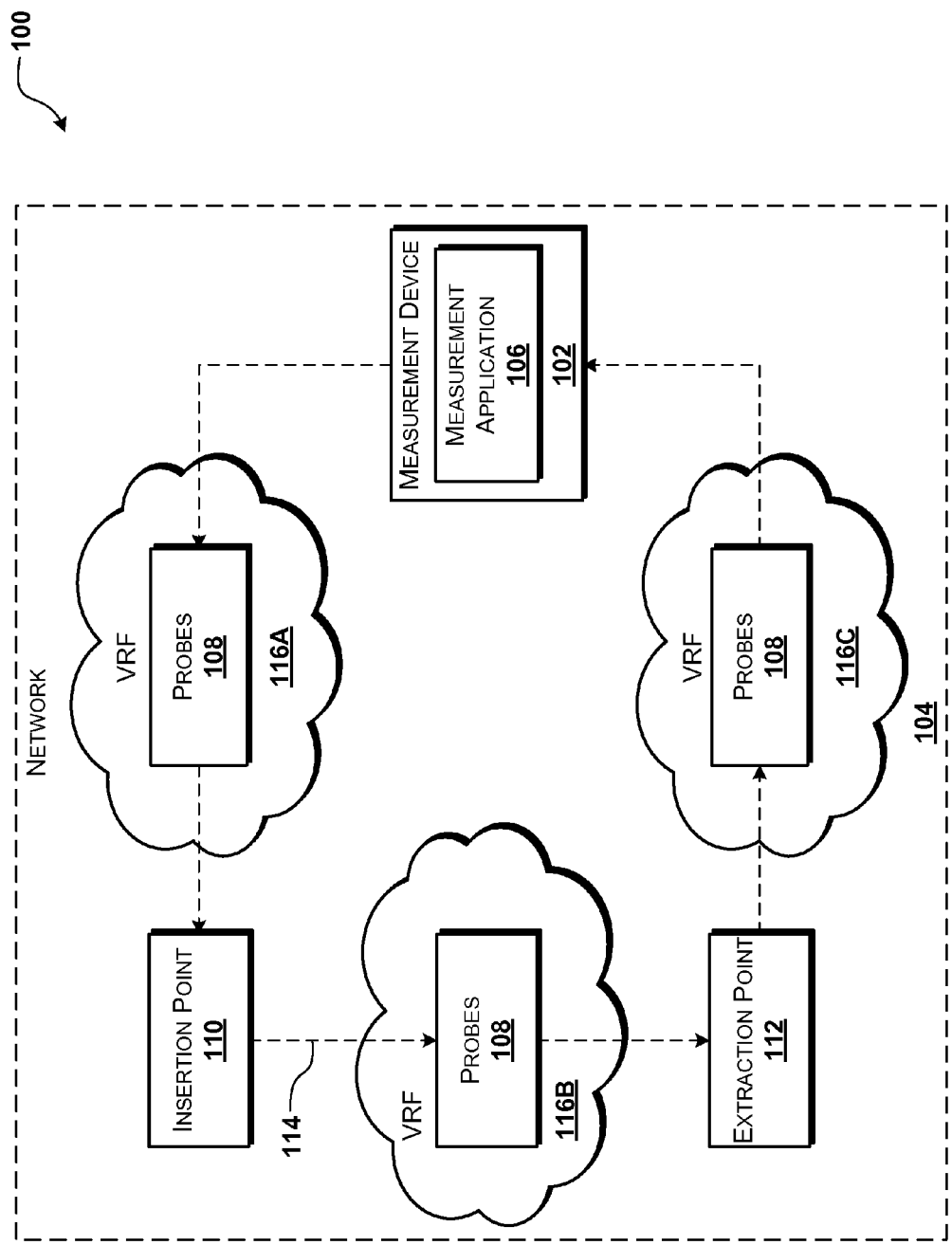
FIG. 1 is a system diagram schematically illustrating an exemplary operating environment for various embodiments disclosed herein.

Referring now to FIG. 1, aspects of an exemplary system 100 for detecting and measuring network route reconvergence using in-band data probes are described, according to an exemplary embodiment. The system 100 includes a measurement device 102 operating on or in communication with a communications network 104 ("network"). According to various embodiments, the network 104 includes one or more communications networks including, but not limited to, cellular networks, packet data networks, and/or public switched telephone networks. These and other aspects of an exemplary embodiment of the network 104 are described below with reference to FIG. 4.

The measurement device 102 is configured to execute an operating system (not illustrated) and one or more application programs including, but not limited to, a measurement application 106. The operating system is a computer program for controlling the operation of the measurement device 102. Examples of operating systems include, but are not limited to, the WINDOWS family of operating systems from MICROSOFT CORPORATION, LINUX, SYMBIAN from SYMBIAN LIMITED, BREW from QUALCOMM CORPORATION, MAC OS from APPLE CORPORATION, and FREEBSD.

The measurement application 106 is an executable program configured to execute on top of the operating system to provide the functionality described herein for detecting and measuring network route reconvergence using in-band data probes. While the measurement device 102 is described herein as executing the measurement application 106, it should be understood that this embodiment is exemplary. More particularly, in some embodiments, the measurement application 106 is embodied in a hardware device separate from the measurement device 102.

The measurement application 106 is configured to configure and generate data probes 108 ("probes") for testing network route reconvergence. As generally is understood, the probes 108 can be used to test portions of the network 104. In particular, the functionality of the probes 108 can be provided by data packets that are routed to a portion of the network 104, inserted into the network 104 at an insertion point 110, and routed to an extraction point 112 along a measurement line 114. In these embodiments, the measurement line 114 can correspond to a portion of the network 104 being tested with the probe 108.

In various implementations (not illustrated), the probes 108 are generated out-of-band by distributed packet generation devices (not illustrated), routed through tested network connections, and then extracted from the network 104. As is generally known, for the probes 108 to be useful for test purposes, the probes 108 must be routed to a centrally located measurement device such as the measurement device 102 for analysis. The probes 108 are analyzed, for example, by examining values in the Time-To-Live ("TTL") field of the packets to determine how many route changes the probes 108 were subjected to along the tested network path. Thus, if the probes 108 are routed to the measurement device 102 via the network 104, the probes 108 may be subjected to further route changes, resulting in decrementing of the value in the TTL field of the probes 108, and therefore affecting the usefulness of the probes 108 in detecting network reconvergence.

Thus, in some implementations, the probes 108 are transmitted to the insertion point 110 via out-of-band connections such as "long-haul" connections between the measurement device 102 and the insertion point 110. Alternatively, measurement devices such as the measurement device 102 can be distributed across the network 104 to allow generation, insertion, extraction, and analysis of the probes 108 without the use of out-of-band connections. According to various embodiments, these approaches to testing network reconvergence are expensive because of the costs of installing and maintaining the long-haul connections and/or multiple instances of the measurement devices 102. This may be particularly true when considering testing of globally distributed networks.

According to various implementations, the concepts and technologies disclosed herein obviate the need for out-of-band connections and/or distributed measurement devices such as the measurement device 102. According to these embodiments, as illustrated in FIG. 1, the probes 108 are transmitted from the measurement device 102 to the insertion point 110 via an in-band connection between the measurement device 102 and the insertion point 110. In various embodiments, the in-band connection between the measurement device 102 and the insertion point 110 includes an in-band connection configured using virtual private network ("VPN") routing and forwarding ("VRF") technologies 116A (hereinafter referred to as the "VRF 116A"). Those skilled in the art will recognize that the VRF 116A can correspond, in some embodiments, to a device operating in accordance with Multiprotocol Label Switching ("MPLS") VPN technology. It should be understood that this embodiment is exemplary, and should not be construed as being limiting in any way.

In the illustrated implementation, the VRF 116A provides a VPN between the measurement device 102 and the insertion point 110. According to embodiments, the probes 108 can be configured within the operating environment 100 such that the TTL fields of the probes 108 are affected only in desired portions of the network 104. For example, in some embodiments, the TTL fields of the probes 108 are not affected by any route changes occurring in the VRF 116A.

Another VRF 116B can be associated with the measurement line 114 between the insertion point 110 and the extraction point 112. The TTL fields of the probes 108 can be allowed to be affected by route changes occurring in the VRF 116B. In particular, hardware associated with the VRF 116A and/or the measurement device 102 can disable the TTL measurement of the probe 108 when the probe 108 is transmitted from the measurement device 102 or into the VRF 116A. Hardware associated with the VRF 116B can enable the TTL measurement of the probe 108 when the probe 108 is received at the insertion point 110 or leaves the VRF 116A. Additionally, the TTL measurement of the probe 108 can again be disabled when the probe 108 arrives at the extraction point 112 or leaves the VRF 116B. As such, when the probe 108 arrives at the extraction point 112, the TTL field of the probe 108 can reflect only route changes experienced within the VRF 116B, corresponding, in some embodiments, to the measurement line 114.

The probes 108 can be transmitted back to the measurement device 102 via another VRF 116C. It will be understood that the TTL measurement of the probe 108 again can be disabled when the probe 108 enters the VRF 116C, leaves the VRF 116B, and/or arrives at the extraction point 112. Thus, when the probes 108 arrive at the measurement device 102, the TTL field of the probes 108 still can reflect only route changes experienced within the VRF 116B, corresponding, in some embodiments, to the measurement line 114. It therefore will be appreciated that the operating environment 100 illustrated in FIG. 1 can be used to obviate a need for costly out-of-band connections between measurement devices 102 and measurement lines 114, and/or multiple instances of the measurement devices 102.

While the embodiment illustrated in FIG. 1 shows three VRFs 116A, 116B, 116C, it should be understood that this embodiment is exemplary. In some contemplated embodiments, the operating environment includes two VRFs such as the VRF 116B and the VRF 116C. According to various implementations, the operating environment 100 includes two, three, or more than three VRFs 116A, 116B, 116C.

The probes 108 arrive at the measurement device 102 for analysis. The measurement application 106 is configured to analyze the TTL field of the probes 108 to determine a number of route changes experienced by the probes 108. According to some embodiments of the concepts and technologies disclosed herein, billions of probes 108 each day are generated, inserted into the network 104, routed through measurement lines 114, extracted from the network 104, and returned to the measurement device 102 for analysis. Thus, the measurement application 106 may be configured to analyze an incoming stream of the probes 108 to identify changes in the pattern of values associated with the TTL field of the probes 108. It should be understood that this embodiment is exemplary, and should not be construed as being limiting in any way.

According to implementations, the use of the probes 108 as disclosed herein allows network operators or other authorized entities to quickly detect problems within the network 104. In one embodiment, problems within the network 104 can be detected within fifty milliseconds (50 ms) or less. When problems are detected, the measurement application 106 or other devices or network nodes can generate alarms or take other actions to remediate or cause other devices or nodes to remediate the problems. Methods for remediating network problems are generally known, and therefore will not be described herein in additional detail.

FIG. 1 illustrates one measurement device 102, one network 104, one insertion point 110, one extraction point 112, one measurement line 114, and three VRFs 116A, 116B, 116C. It should be understood, however, that some implementations of the operating environment 100 include multiple measurement devices 102, multiple networks 104, multiple insertion points 110, multiple extraction points 112, more than one measurement line 114, and more than three or fewer than three VRF's 116A, 116B, 116C. As such, the illustrated embodiment should be understood as being exemplary, and should not be construed as being limiting in any way.

Figure 2:
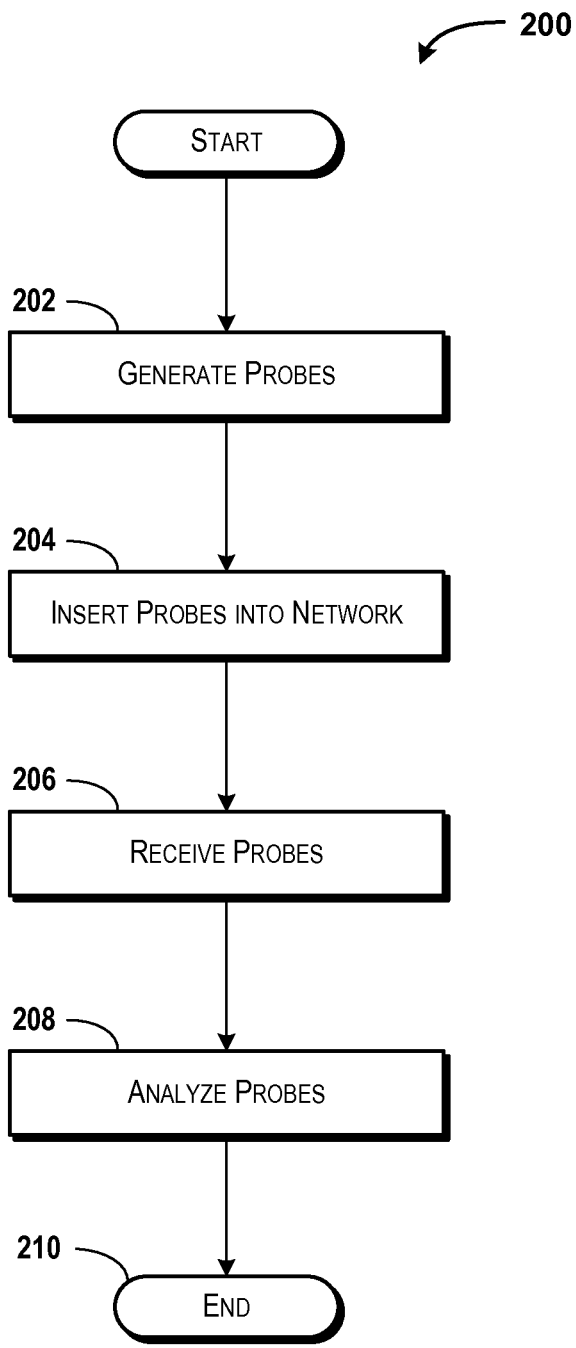
FIG. 2 is a flow diagram showing aspects of a method for detecting and measuring network route reconvergence using in-band data probes, according to an exemplary embodiment.

Turning now to FIG. 2, aspects of a method 200 for detecting and measuring network route reconvergence using in-band data probes will be described in detail, according to an exemplary embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the methods disclosed herein can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the measurement device 102. It should be understood that the measurement device 102, as well as additional and/or alternative devices and/or network nodes, can provide the functionality described herein via execution of one or more application programs including, but not limited to, the measurement application 106. Furthermore, it should be understood that the functionality of the measurement device 102 can be provided by any number of devices or network nodes, and is not limited to the measurement device 102 illustrated in the FIGURES. Thus, the illustrated embodiment is exemplary, and should not be viewed as being limiting in any way.

The method 200 begins at operation 202, wherein the measurement device 102 generates the probes 108. As explained above, the probes 108 can include data packets generated by the measurement device 102 for insertion into the network 104 and routing through the measurement line 114 to detect and measure network route reconvergence. As explained above, the probes 108 can be configured at the measurement device 102 to disable the TTL measurement capability of the probes 108.

From operation 202, the method 200 proceeds to operation 204, wherein the measurement device 102 inserts the probes 108 into the network 104. More particularly, the measurement device 102 inserts the probes 108 into an in-band network connection such as the VRF 116A. Additional details of insertion of the probes 108 into the network 104, routing the probes 108 through the measurement line 114 and/or the VRF 116B are set forth below with reference to FIG. 3. Briefly, in some embodiments the probes 108 are routed to an insertion point 110 of the network 104 via the in-band connection, e.g., the VRF 116A, routed through the measurement line 114, e.g., the VRF 116B, and extracted from the network 104 at the extraction point 112. It should be understood that this embodiment is exemplary, and should not be construed as being limiting in any way.

From operation 204, the method 200 proceeds to operation 206, wherein the measurement device 102 receives the probes 108. In some embodiments, the probes 108 are routed to the measurement device 102 via the VRF 116C. As explained above with reference to FIG. 1, the VRF 116C can include an in-band connection between the extraction point 112 and the measurement device 102. It should be understood that the VRFs 116A, 116B, 116C can include a number of VPNs and/or other private networks and are not necessarily limited to VRFs as described herein.

From operation 206, the method 200 proceeds to operation 208, wherein the measurement device 102 analyzes the probes 108. As explained above, billions of probes 108 can be sent per day. Thus, the measurement device 102 can be configured to analyze the probes 108 to identify patterns associated with the network 104 and/or network route reconvergence associated with the network 104. Thus, for example, the measurement device 102 can identify an average or expected value for TTL fields of the probes 108 and/or time stamp information associated with the probes 108, and search the incoming probes to identify deviation from the average or expected TTL field values.

More particularly, in some embodiments, the probes 108 incoming to the measurement device 102 are analyzed to determine if the TTL fields, time stamp information, and/or other data associated with the probes 108 is within a defined threshold or range of expected values. When data associated with the probe 108 or a number of the probes 108 is recognized by the measurement device 102 as deviating from expected values or ranges of values, the measurement device 102 can be configured to determine that an error in the network 104 exists. It should be understood that this embodiment is exemplary, and should not be construed as being limiting in any way.

Although not illustrated in FIG. 2, the measurement device 102 and/or other devices in communication with the measurement device 102 (not illustrated) can be configured to generate alarms or take remedial action when network errors, issues, or problems are recognized by the measurement device 102. According to various implementations, errors or issues with the network 104 can be recognized by the measurement device 102 within fifty milliseconds or less of the error or issue arising in the network 104. It should be understood that this embodiment is exemplary, and should not be construed as being limiting in any way. From operation 208, the method 200 proceeds to operation 210. The method 200 ends at operation 210.

Figure 3:
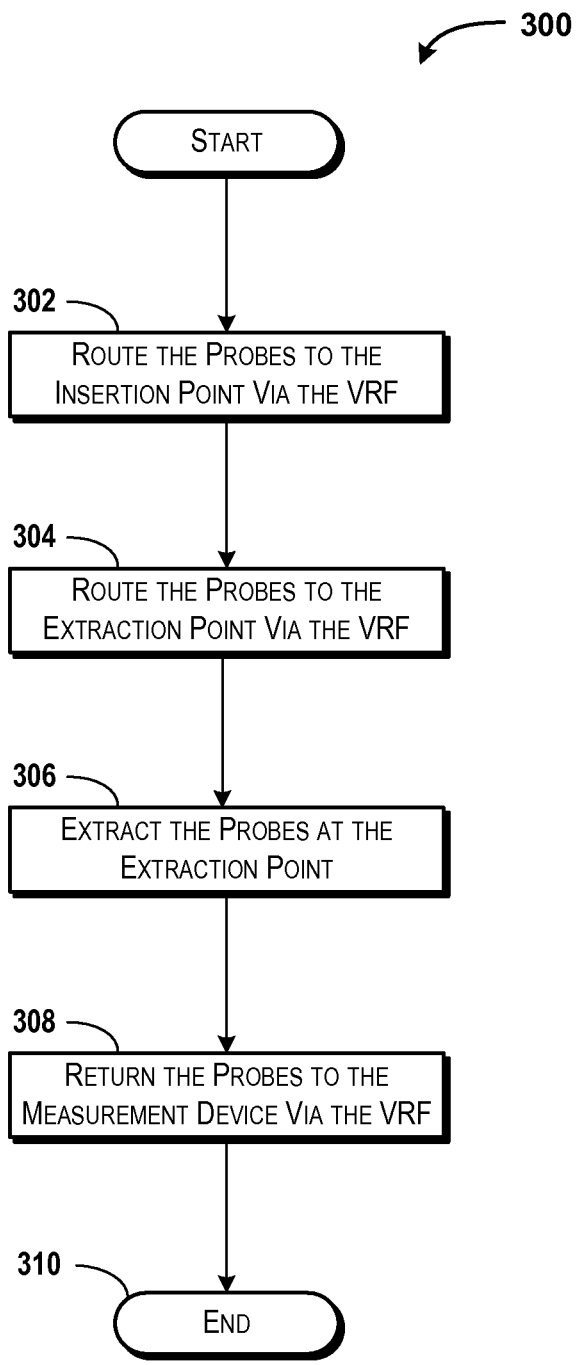
FIG. 3 is a flow diagram showing additional aspects of the method for measuring network route reconvergence using in-band data probes, according to an exemplary embodiment.

Turning now to FIG. 3, aspects of a method 300 for detecting and measuring network route reconvergence using in-band data probes will be described in detail, according to an exemplary embodiment. It should be understood that the method 300, and/or other methods, can be, but are not necessarily, performed by the measurement device 102 at operation 204 of the method 200 illustrated in FIG. 2. It should be understood that this embodiment is exemplary, and should not be construed as being limiting in any way.

The method 300 begins at operation 302, wherein the measurement device 102 routes the probes 108 to the insertion point 110. As explained above with reference to FIGS. 1-2, the measurement device 102 can be configured to route the probes 108 to the insertion point 110 via the VRF 116A or other in-band network connections. It should be understood that this embodiment is exemplary, and should not be construed as being limiting in any way.

According to various implementations of the concepts and technologies disclosed herein, the measurement device 102, or other devices or network nodes in communication with the measurement device 102, is configured to disable the TTL measurement capabilities of the probes 108 before inserting the probes 108 into the network 104. In some embodiments, the measurement device 102 is configured with software that enables functionality for enabling and/or disabling the TTL measurement capabilities of data packets such as the probes 108. This software and/or capability can be distributed across the network 104 to devices interacting with the probes 108 such that the TTL capability of the probes 108 can be enabled and/or disabled at various points in the network 104. Thus, embodiments of the concepts and technologies disclosed herein allow the measurement device 102 to route the probes 108 through in-band connections on the network 104 without affecting the TTL field of the probes 108.

From operation 302, the method 300 proceeds to operation 304, wherein the probes 108 are routed through the measurement line 114 of the network 104. As explained above, the VRF 116B can be configured for the measurement line 114, and the probes 108 can be routed through the VRF 116B to collect data regarding network route reconvergence within that portion of the network 104. Hardware or software associated with the insertion point 110 and/or the VRF 116B can be configured to enable the TTL measurement capability of the probes 108 such that the TTL fields of the probes 108 will be affected by route path changes as the probes 108 cross the measurement line 114.

From operation 304, the method 300 proceeds to operation 306, wherein the probes 108 are extracted from the network 104 at the extraction point 112. As explained above, the TTL measurement capabilities of the probes 108 can be disabled as the probes 108 arrive at and/or are extracted from the VRF 116B at the extraction point 112. According to various embodiments, hardware and/or software associated with the extraction point 112, the VRF 116B, and/or the VRF 116C is configured to disable the TTL measurement capabilities of the probes 108. Because the TTL measurement capabilities of the probes 108 are disabled for the probes 108 other than while the probes 108 are travelling along the measurement line 114, the probes 108 can capture data representing the number of network route changes experienced only while the probes 108 travel along the measurement line 114.

From operation 306, the method 300 proceeds to operation 308, wherein the probes 108 are returned to the measurement device 102. In some embodiments, the probes 108 are returned to the measurement device 102 via an in-band connection such as, for example, the VRF 116C. It should be understood that this embodiment is exemplary, and should not be construed as being limiting in any way. As mentioned above, the TTL measurement capabilities of the probes 108 can be disabled such that the probes 108 are returned to the measurement device 102 reflecting only network route changes experienced by the probe 108 while travelling along the measurement line 114.

From the above description, it will be appreciated that probes 108 can be inserted into the network 104, routed to an insertion point 110 of the network 104 via an in-band connection such as the VRF 116A, inserted into a measurement line 114 such as the VRF 116B, routed to an extraction point 112, extracted from the network 104, and returned to the measurement device 102 via an in-band connection such as the VRF 116C while only capturing network route changes associated with the measurement line 114. It should be understood that the method 300 can be controlled by the measurement device 102 and/or devices in communication with the measurement device 102. From operation 308, the method 300 proceeds to operation 310. The method 300 ends at operation 310.

Figure 4:
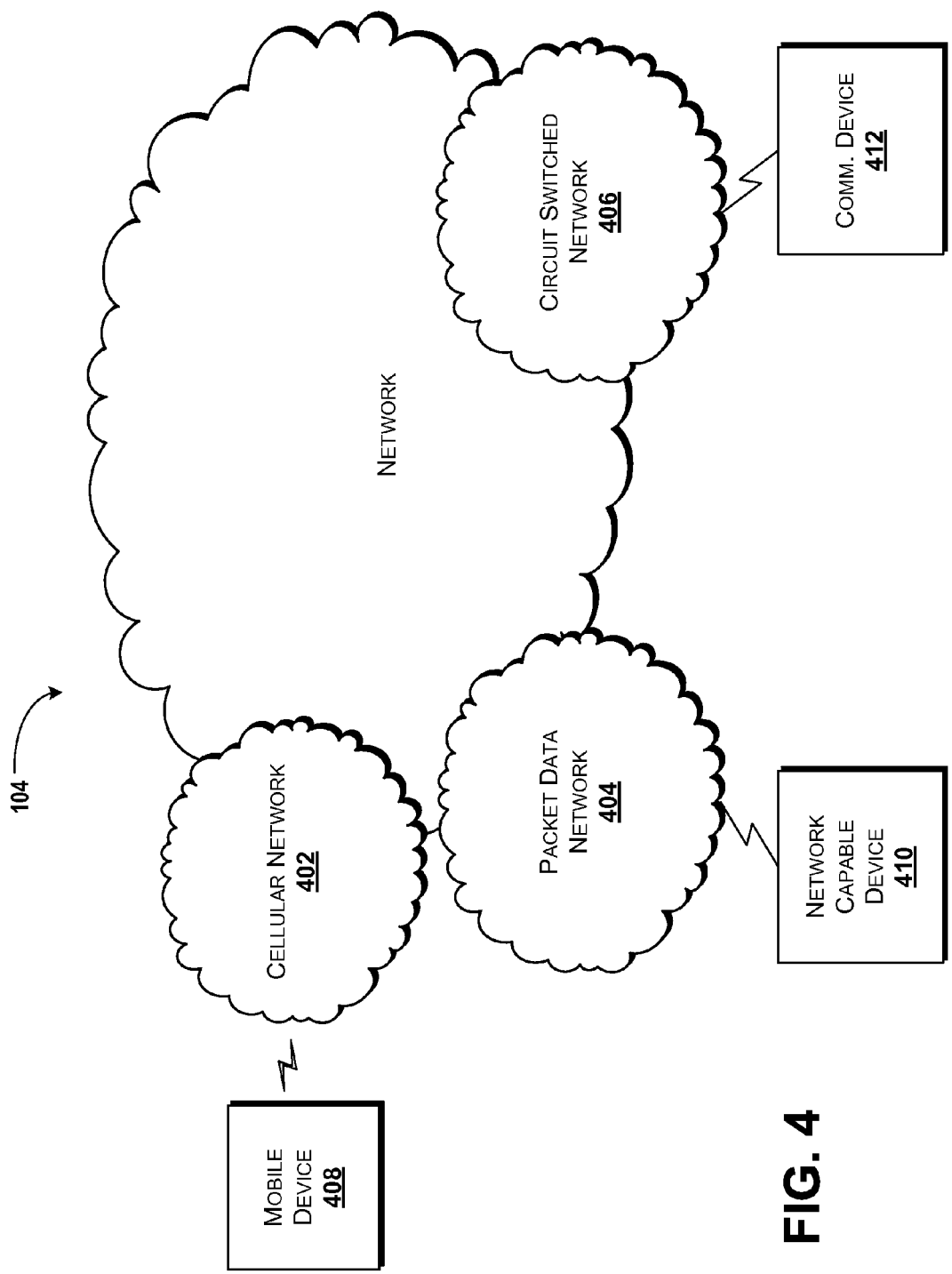
FIG. 4 schematically illustrates a network, according to an exemplary embodiment.

Turning now to FIG. 4, additional details of the network 104 are illustrated, according to an exemplary embodiment. The network 104 includes a cellular network 402, a packet data network 404, for example, a private or corporate network, a public network, the Internet, and other networks, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, a smartphone, other devices, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with another, as is generally known. The servers often store various files that are provided to a requesting device such as, for example, one or more network-capable devices 410 such as computers, servers, databases, set-top boxes ("STBs"), smartphones, other devices, and the like. For example, the network-capable devices 410 can execute software (a "browser") for executing a web page in a format readable by the browser or other software and/or otherwise accessing content hosted or stored on the network 104. For example, other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more of the network-capable devices 410, for example, a PC, a laptop, a portable device, or another suitable device, can communicate with one or more cellular networks 402, and devices connected thereto, through the packet data network 404. It also should be appreciated that a network-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the network-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
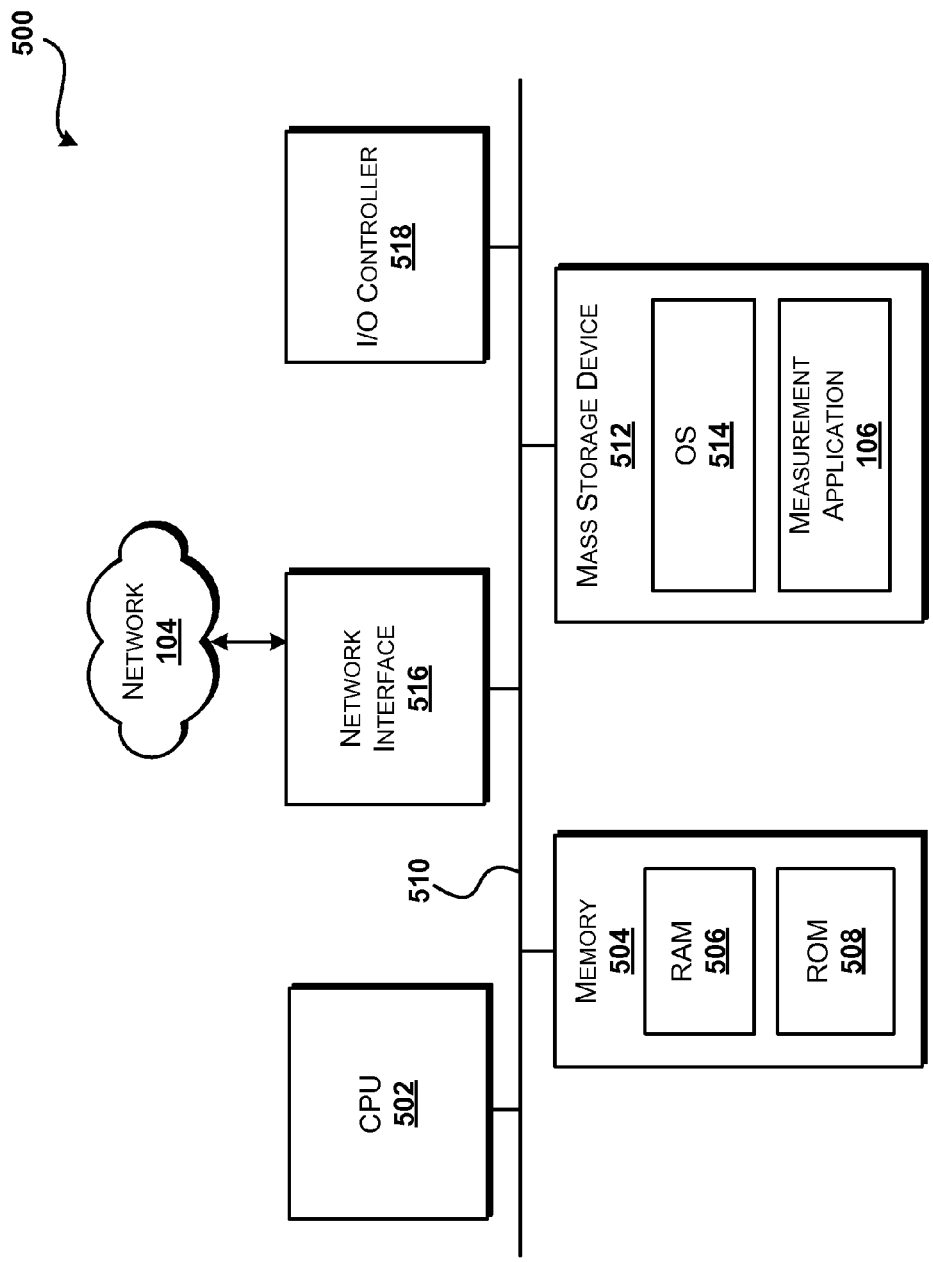
FIG. 5 is a computer architecture diagram illustrating an exemplary computer hardware and software architecture for a device capable of implementing aspects of the embodiments presented herein.

FIG. 5 illustrates an exemplary computer architecture 500 for a device capable of executing the software components described herein for detecting and measuring network route reconvergence using in-band data probes 108. Thus, the computer architecture 500 illustrated in FIG. 5 illustrates an architecture for the measurement device 102 or another device, which can be embodied in one or more server computers, workstations, and/or other computing devices. In the illustrated embodiment, the computer architecture 500 illustrates a server computer that provides the functionality of the measurement device 102. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 514 and the measurement application 106.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. In the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface 516 connected to the bus 510. The network interface 516 may be utilized to connect to other types of networks and remote computer systems. The computer architecture 500 also may include an input/output controller 518 for receiving and processing input from a number of other devices, including a keyboard, mouse, touchscreen, or electronic stylus (not shown in FIG. 5). Similarly, the input/output controller 518 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that systems and methods for detecting and measuring network route reconvergence using in-band data probes have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

I claim:

1. A method comprising:
   generating, at a measurement device executing a measurement application, a probe that comprises a time-to-live field;
   disabling, by the measurement device, changes to the time-to-live field of the probe;
   inserting, by the measurement device, the probe at an in-band connection;
   initiating routing, by the measurement device, of the probe to an extraction point located at an end of a measurement line via an insertion point being located at a beginning of the measurement line, wherein the changes to the time-to-live field are enabled by a device associated with the insertion point when the probe reaches the insertion point, and wherein the changes to the time-to-live field are disabled by a device associated with the extraction point when the probe reaches the extraction point so the probe measures only network path changes occurring at the measurement line;
   receiving, at the measurement device, the probe;
   analyzing, by the measurement device, the probe; and
   measuring, by the measurement device, the network route reconvergence based upon a value in the time-to-live field, wherein the time-to-live field reflects only the network path changes occurring at the measurement line.

2. The method of claim 1, wherein the in-band connection comprises a device configured as a virtual private network.

3. The method of claim 2, wherein the measurement line comprises a further in-band connection.

4. The method of claim 1, wherein the in-band connection comprises a device configured in accordance with a multiprotocol label switching virtual private network routing and forwarding technology.

5. The method of claim 1, further comprising receiving the probe routed from the extraction point to the measurement device via a further in-band connection, the further in-band connection comprising a device configured as a further virtual private network.

6. The method of claim 1, wherein the probes are routed to the insertion point without use of an out-of-band connection between the measurement device and the insertion point.

7. A method comprising:
   generating, at a measurement device executing a measurement application, a probe that comprises a time-to-live field;
   disabling, by the measurement device, changes to the time-to-live field of the probe;
   inserting, by the measurement device, the probe at an in-band connection~ wherein the time-to-live field of the probe does not capture network path changes occurring at the in-band connection when inserted by the measurement device;
   initiating, by the measurement device, routing of the probe to a measurement line comprising an insertion point located at a beginning of the measurement line and an extraction point located at an end of the measurement line, wherein the probe is routed to the end of the measurement line via the in-band connection and via the insertion point, and wherein changes to the time-to-live field are enabled by a device associated with the insertion point when the probe reaches the insertion point and wherein the changes to the time-to-live field are disabled by a device associated with the extraction point when the probe reaches the extraction point so the probe measures only network path changes occurring at the measurement line;
   receiving, at the measurement device, the probe
   analyzing, by the measurement device, the time-to-live field of the probe; and
   determining, by the measurement device, the network route reconvergence associated with the measurement line based upon a value in the time-to-live field of the probe, wherein the time-to-live field of the probe reflects only the network path changes occurring at the measurement line.

8. The method of claim 7, wherein the in-band connection comprises a device configured as a virtual private network.

9. The method of claim 8, wherein the further in-band connection comprises a further device configured as a further virtual private network.

10. The method of claim 7, wherein the in-band connection comprises a device configured in accordance with a multiprotocol label switching virtual private network routing and forwarding technology.

11. The method of claim 10, wherein the further in-band connection comprises a further device configured in accordance with the multiprotocol label switching virtual private network routing and forwarding technology.

12. The method of claim 7, wherein the probes are routed to the insertion point without use of an out-of-band connection between the measurement device and the insertion point.

13. A computer storage medium comprising computer executable instructions that, when executed by a processor, cause the processor to perform operations comprising:
generating a probe that comprises a time-to-live field;
disabling changes to the time-to-live field of the probe;
inserting the probe into an in-band connection;
initiating routing of the probe through a network to measure network route reconvergence associated with a portion of the network corresponding to a measurement line comprising an insertion point located at a beginning of the measurement line and an extraction point located at an end of the measurement line, wherein the changes to the time-to-live field are enabled by a device associated with the insertion point when the probe reaches the insertion point, and wherein the changes to the time-to-live field are disabled by a device associated with the extraction point when the probe reaches the extraction point so the probe measures only network path changes occurring at the measurement line;
receiving the probe;
analyzing the time-to-live field of the probe; and
determining, based upon a value in the time-to-live field, the network route reconvergence associated with the measurement line, wherein the time-to-live field reflects only the network path changes occurring at the measurement line.

14. The computer storage medium of claim 13, wherein the in-band connection comprises a device configured as a virtual private network.

15. The computer storage medium of claim 13, wherein the measurement line comprises a device configured as a virtual private network.

16. The computer storage medium of claim 13, wherein the in-band connection comprises a device configured in accordance with a multiprotocol label switching virtual private network routing and forwarding technology.

17. The computer storage medium of claim 16, wherein the further in-band connection comprises a further device configured in accordance with the multiprotocol label switching virtual private network routing and forwarding technology.

18. The computer storage medium of claim 13, wherein the probes are routed to the insertion point without use of an out-of-band connection between the measurement device and the insertion point.

* * * * *